US009298316B2

(12) United States Patent
 Chen et al.

(10) Patent No.: US 9,298,316 B2
(45) Date of Patent: Mar. 29, 2016

(54) OPTICAL TOUCH DISPLAY PANEL

(71) Applicant: AU OPTRONICS CORP., Hsinchu (TW)

(72) Inventors: Han-Ming Chen, Hsinchu (TW); Yueh-Hung Chung, Taipei (TW); Ya-Ling Hsu, New Taipei (TW); Hsueh-Ying Huang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 298 days.

(21) Appl. No.: 13/891,266

(22) Filed: May 10, 2013

(65) Prior Publication Data
 US 2014/0125632 A1   May 8, 2014

(30) Foreign Application Priority Data

Nov. 7, 2012   (TW) .............................. 101141378 A

(51) Int. Cl.
 *G06F 3/042*   (2006.01)
 *G06F 3/041*   (2006.01)
(52) U.S. Cl.
 CPC .............. *G06F 3/042* (2013.01); *G06F 3/0412* (2013.01)
(58) Field of Classification Search
 None
 See application file for complete search history.

(56) References Cited

U.S. PATENT DOCUMENTS

| 2009/0135158 | A1* | 5/2009 | Takahashi | ............... | G06F 3/044 345/174 |
| 2011/0169772 | A1* | 7/2011 | Liu | .................. | G06F 3/0412 345/175 |
| 2011/0261017 | A1* | 10/2011 | Park | ......................... | G01J 1/44 345/175 |
| 2011/0310036 | A1* | 12/2011 | Juan | ...................... | G06F 3/0412 345/173 |
| 2013/0009930 | A1* | 1/2013 | Cho | ...................... | G09G 3/2003 345/211 |
| 2013/0063398 | A1* | 3/2013 | Ko | ........................ | G06F 3/0412 345/175 |

FOREIGN PATENT DOCUMENTS

| CN | 102402347 |   | 4/2012 |
| CN | 102402347 A | * | 4/2012 |

OTHER PUBLICATIONS

China Patent Office, "Office Action," May 6, 2015.

* cited by examiner

*Primary Examiner* — Seokyun Moon
*Assistant Examiner* — Josemarie G Acha, III
(74) *Attorney, Agent, or Firm* — WPAT, PC; Justin King

(57) ABSTRACT

An optical touch display panel includes a plurality of resetting signal lines, a plurality of scanning signal lines, and a plurality of optical sensing touch units. Each optical sensing touch unit includes an optical sensing element and a storage capacitor. The optical sensing elements in a first direction are connected electrically to different scanning signal lines, and are configured to respectively receive a control signal. The optical sensing elements in a second direction includes a plurality of groups, and the optical sensing elements of each group are connected electrically to different resetting signal lines, so that each group receives a reset signal. Each optical sensing element outputs a charging signal corresponding to the reset signal to the storage capacitor according to the control signal, so as to reset a voltage of the storage capacitor.

15 Claims, 17 Drawing Sheets

OPTICAL TOUCH DISPLAY PANEL

CROSS-REFERENCES TO RELATED APPLICATIONS

This non-provisional application claims priority under 35 U.S.C. §119(a) on Patent Application No. 101141378 filed in Taiwan, R.O.C. on Nov. 7, 2012, the entire contents of which are hereby incorporated by reference.

BACKGROUND

1. Technical Field

The disclosure relates to a touch display panel, and more particularly, to an optical touch display panel.

2. Related Art

With development of science, currently many consumer electronic products (for example, a personal digital assistant (PDA), a mobile phone, and a tablet computer etc.) widely use a touch display panel as a communication interface of man-machine data. The touch display panel may detect a position on which a user touches the touch display panel by using different sensing technologies, for example, resistance type, capacitance type, and optical sensing type.

FIG. 1 is a schematic view of detection of an optical sensing touch display panel 100. FIG. 2 is a schematic view of another detection of the optical sensing touch display panel 100. FIG. 3 is a schematic view of optical sensing signals generated by the optical sensing element 110 after receiving different light intensities.

As shown in FIG. 1, the optical sensing touch display panel 100 includes an optical sensing element 110, configured to detect variation of an outside light source. In typical situations, the optical sensing element 110 detects an ambient light L to generate an optical sensing signal LS1 (as shown in FIG. 3).

Please refer to FIG. 1, in which when a finger 120 contacts or approaches the optical sensing touch display panel 100 to shield the optical sensing element 110 from receiving the ambient light L, the optical sensing element 110 correspondingly generates an optical sensing signal LS2 (as shown in FIG. 3).

Please refer to FIG. 2, in which when a light pen 130 approaches or contacts the optical sensing touch display panel 100, in addition to receiving the ambient light L, the optical sensing element 110 receives a light output by the light pen 130, and correspondingly generates an optical sensing signal LS3 (as shown in FIG. 3).

As shown in FIG. 3, the optical sensing element 110 is, for example, a thin-film transistor (TFT), when a gate (G) source (S) voltage (that is, Vgs) of the optical sensing element 110 is smaller than 0 volt, the greater the light intensity received by the optical sensing element 110 is, the larger a drain source current Ids is.

FIG. 4 is a circuit diagram of detection of the optical sensing element 110. FIG. 5 is a schematic view of a gate source voltage Vgs corresponding to a reading signal RO of a voltage level of a first end Va of a storage capacitor under irradiation of different light sources.

As shown in FIG. 4, the optical sensing element 110 is connected electrically to the storage capacitor Cs1, when the optical sensing element 110 generates different optical sensing signals (that is, the drain source current Ids), after detecting different light sources, the voltage level of the first end Va of the storage capacitor Cs1 is reduced accordingly. By reading the voltage level of the first end Va of the storage capacitor Cs1, it may be determined whether touch input exists.

For example, the light pen 130 as shown in FIG. 2 is configured to perform touch input, before the touch input, the optical sensing element 110 only receives irradiation of the ambient light L, so that the reading signal RO generated after the voltage level of the first end Va of the storage capacitor Cs1 is read is a dark state voltage V1 (as shown in FIG. 5). During the touch input, in addition to receiving the ambient light L, the optical sensing element 110 receives the light output by the light pen, so that the reading signal is a bright state voltage V2 (as shown in FIG. 5). Through determining whether a voltage difference ΔV between the bright state voltage V2 and the dark state voltage V1 exceeds a preset threshold value, it is determined whether the touch input exists.

After the voltage level of the first end Va of the storage capacitor Cs1 is read, in order to detect the touch input again, the voltage of the storage capacitor Cs1 needs to be reset, that is, the storage capacitor Cs1 is charged to a reset voltage. However, in order to synchronize a touch interface and a display picture, usually a touch detection frequency is the same as a picture update frequency (that is, a frame rate). The frame rate is limited, so charging time (hereafter referred to as reset time), of the storage capacitor Cs1 is limited, so that the voltage level after the storage capacitor Cs1 is reset is not high enough, therefore, the level of the dark state voltage is relatively low. Under the situation that the level of the bright state voltage is not changed, the voltage difference ΔV is smaller, so that a signal to noise ratio becomes lower, thereby resulting in misjudgment during a touch detection event.

Additionally, usually the multiple optical sensing elements 110 in the same direction may be connected electrically to the same resetting signal line Sn, so as to receive the reset signal fed by the resetting signal line Sn. However, a delay effect of the capacitor and the resistor results in that the voltage of the reset signal received by the storage capacitor Cs1 connected to each optical sensing element 110 is further lowered. Furthermore, the storage capacitors Cs1 are connected in parallel through the resetting signal lines Sn, so that resistor-capacitor (RC) loading borne by each position on the resetting signal line Sn are not the same, particularly, a difference of the RC loading between a head end and a tail end is larger. For these reasons, the voltage level after the storage capacitor Cs1 of each optical sensing element 110 is reset is relatively low and inconsistent.

FIG. 6A is a schematic view of reset signals of the head end and the tail end of the resetting signal line Sn. FIG. 6B is a schematic view of charging of the storage capacitor Cs1 of the head end of the resetting signal line Sn. FIG. 6C is a schematic view of charging of the storage capacitor Cs1 of the tail end of the resetting signal line Sn.

As shown in FIG. 6A, a curve A is a waveform of the reset signal measured at the head end (that is, one end near a signal source sending the reset signal), of the resetting signal line Sn, a curve B is a waveform of the reset signal measured at the tail end (that is, one end away from the signal source sending the reset signal), of the resetting signal line Sn. It may be known that the curve A is original a pulse, when being delivered to the tail end of the resetting signal line Sn, the reset signal is distinctly varied because of the delay effect of the capacitor and the resistor (as shown in the curve B). Therefore, at 0.02 ms in FIG. 6A, a voltage of the curve A is approximately 29 volts, and a voltage of the curve B is lowered to be approximately 19 volts.

As shown in FIG. 6B, a curve C is a voltage variation waveform of the storage capacitor Cs1 of the head end of the resetting signal line Sn after being reset; and as shown in FIG. 6C, a curve D is a voltage variation waveform of the storage capacitor Cs1 of the tail end of the resetting signal line Sn after being reset. It may be known that at 0.02 ms, the voltage of the curve C is approximately 18 volts, and the voltage of the curve D is approximately 10 volts (at D). From the difference between the reset voltages of the storage capacitor Cs1 at the head and the tail ends, it may be known that the voltage after the storage capacitor Cs1 on the same resetting signal line Sn is reset is not uniform, so that sensing sensitivity of each touch position of the optical sensing touch display panel 100 is inconsistent, thereby resulting in the misjudgment.

SUMMARY

In view of the above problems, the disclosure is directed to an optical touch display panel, so as to solve a problem of the prior art that misjudgment occurs because a voltage after a storage capacitor on the same resetting signal line is reset is not uniform and a reset voltage level of the storage capacitor is insufficient.

An embodiment of the disclosure provides an optical touch display panel, which includes a plurality of resetting signal lines, a plurality of scanning signal lines, and a plurality of optical sensing touch units. The plurality of optical sensing touch units is arranged in a matrix in a first direction and a second direction vertical to the first direction.

Each optical sensing touch unit includes an optical sensing element and a storage capacitor. The optical sensing element is configured to sense a light source to generate a sensing signal, and includes a control end, an input end, and a control end.

The control ends of the optical sensing elements in the first direction are connected electrically to different scanning signal lines, and are configured to respectively receive a control signal. The optical sensing elements in the second direction include a plurality of groups, the input ends of the optical sensing elements of each group are connected electrically to different resetting signal lines, so that each group receives a reset signal. The output end is configured to output the sensing signal, and output a charging signal corresponding to the reset signal according to the control signal.

The storage capacitor is connected electrically to the output end of the optical sensing element, and is configured to store the sensing signal, and receive the charging signal, so as to reset a voltage of the storage capacitor in response to the charging signal.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 7:
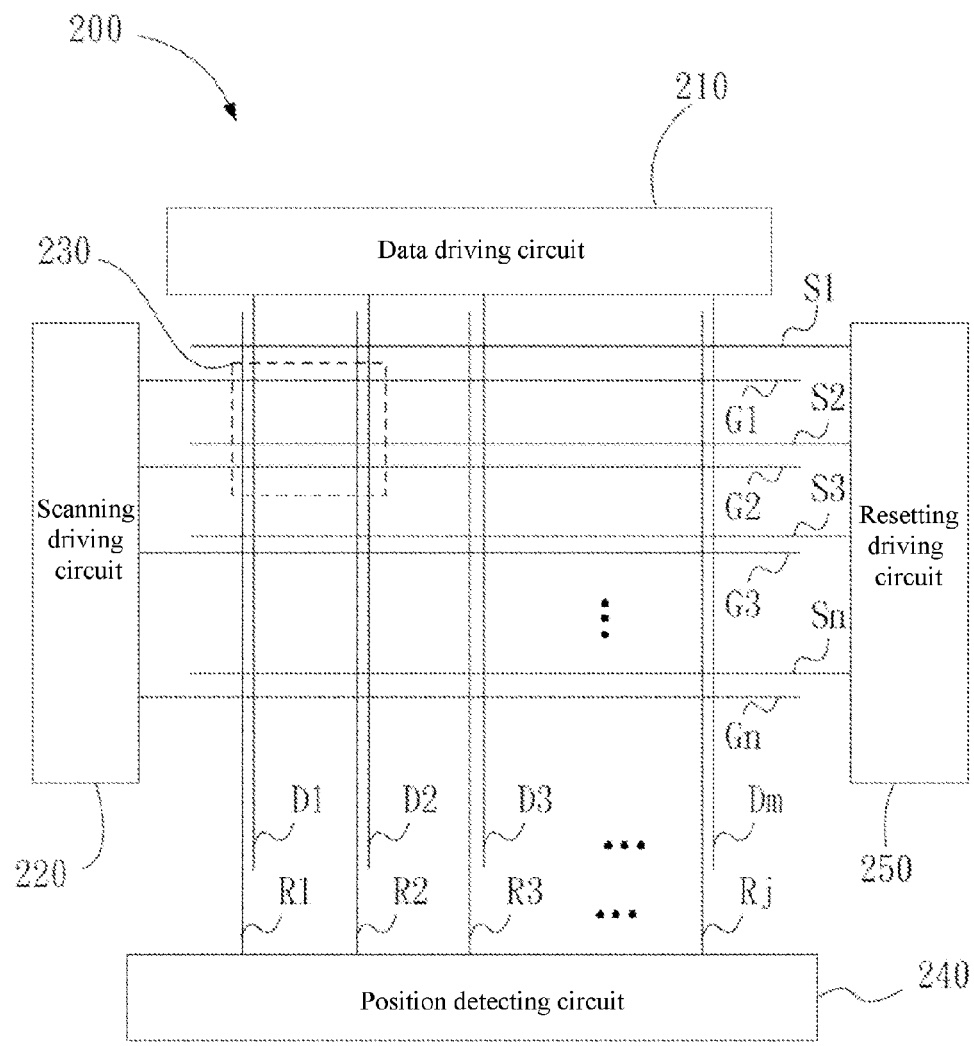
FIG. 7 is a schematic general view of an optical touch display panel according to an embodiment.

FIG. 7 is a schematic general view of an optical touch display panel 200 according to an embodiment.

As shown in FIG. 7, the optical touch display panel 200 includes a data driving circuit 210, a scanning driving circuit 220, a plurality of data signal lines Dm (that is, D1, D2, D3 . . . Dm, m is a positive integer), a plurality of scanning signal lines Gn (that is, G1, G2, G3 . . . Gn, n is a positive integer), a resetting driving circuit 250, a plurality of resetting signal lines Sn (that is, S1, S2, S3 . . . Sn, n is a positive integer) connected to the resetting driving circuit 250, a plurality of pixel regions 230 defined by the scanning signal lines Gn and the data signal lines Dm, a position detecting circuit 240, and a plurality of reading signal lines Rj (that is, R1, R2, R3 . . . Rj, j is a positive integer), connected to the position detecting circuit 240. The pixel regions 230 are arranged in a matrix manner. The data driving circuit 210 is connected electrically to the data signal lines Dm. The scanning driving circuit 220 is connected electrically to the scanning signal lines Gn.

Here, the scanning signal lines Gn are arranged in a first direction (a longitudinal direction here), and is extended towards a second direction (a horizontal direction here), the data signal lines Dm are arranged in the second direction, and is extended towards the first direction. The resetting signal lines Sn are set to be parallel with the scanning signal lines Gn. Further, the first direction is vertical to the second direction. That is to say, the data signal lines Dm and the scanning signal lines Gn are vertical and are set in a staggered manner. The reading signal lines Rj are set to be parallel with the data signal lines Dm, and the same reading signal line Rj may be connected electrically to the optical sensing elements 2321 of each pixel region 230 in the first direction.

Figure 8:
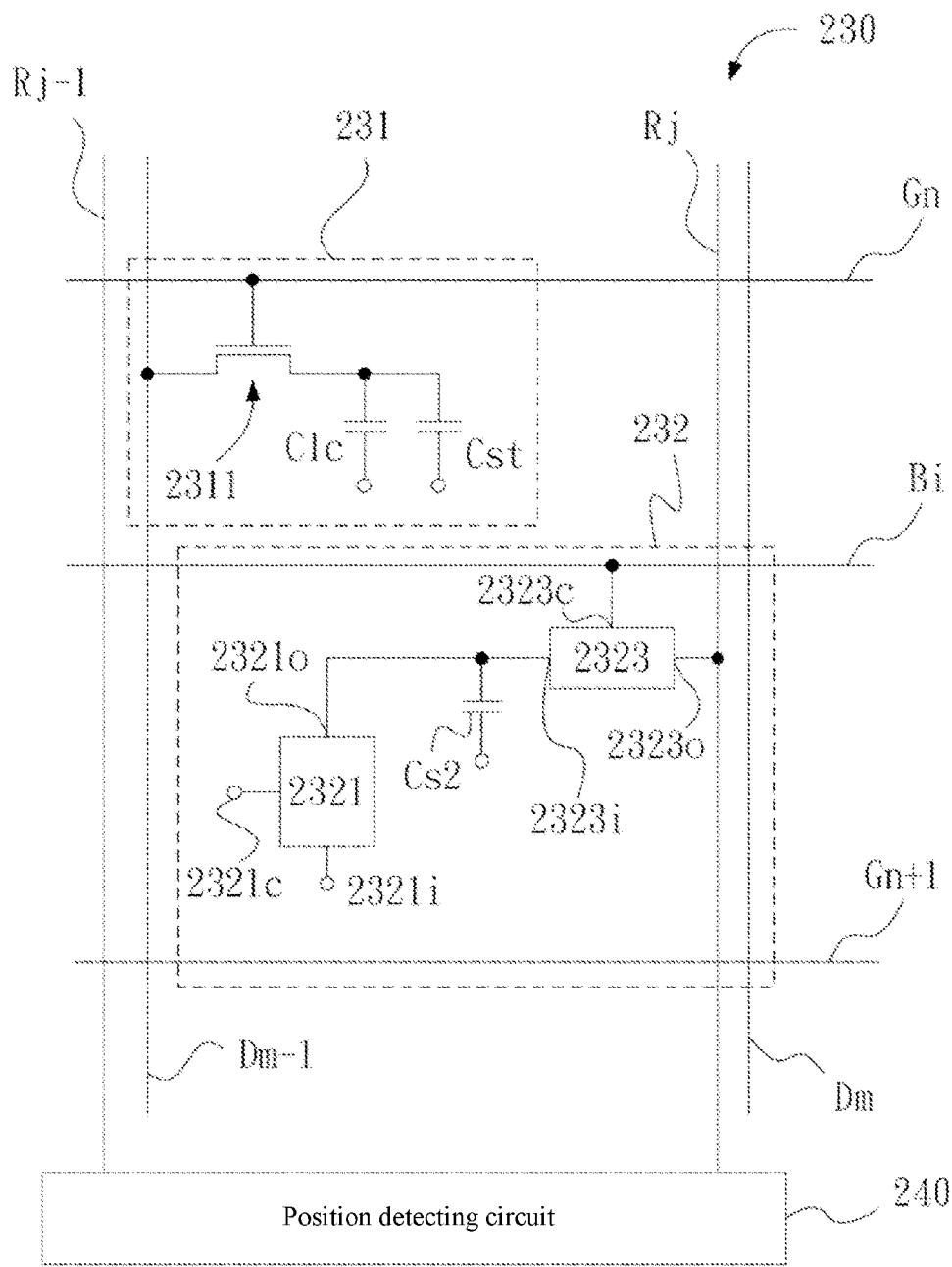
FIG. 8 is a schematic view of a circuit of a pixel region according to an embodiment.

FIG. 8 is a schematic view of an equivalent circuit of the pixel region 230 according to an embodiment.

As shown in FIG. 8, each pixel region 230 includes a pixel unit 231 and an optical sensing touch unit 232. The pixel unit 231 is configured to display an image, and the optical sensing touch unit 232 is configured to detect a touch event.

The pixel unit 231 includes a TFT 2311, a storage capacitor Cst, and a liquid crystal capacitor Clc formed by a pixel electrode and a common electrode structure. A gate of the TFT 2311 is connected to the scanning signal line Gn, and a drain is connected to the data signal line Dm. Through a scanning signal from the scanning driving circuit 220 and transmitted on the scanning signal line Gn, the TFT 2311 is controlled to be conducted or not, so that an image signal transmitted by the data driving circuit 210 may be written in the pixel region 230 from the data signal line Dm. Here, the structure and the operation principle of the pixel unit 231 are well known by persons skilled in the art, so detailed description is not repeated here.

The optical sensing touch unit 232 includes an optical sensing element 2321, a storage capacitor Cs2, and a signal reading element 2323. The optical sensing element 2321 is configured to sense a light source to generate a sensing signal. The storage capacitor Cs2 is connected electrically to the optical sensing element 2321, and is configured to store the sensing signal. Here, the sensing signal enables the storage capacitor Cs2 to perform discharge, that is, the sensing signal is a negative current. The signal reading element 2323 is connected electrically to the storage capacitor Cs2, and is configured to read a voltage of the storage capacitor Cs2, so as to generate a reading signal corresponding to the voltage of the storage capacitor Cs2, in which the reading signal is transmitted to the position detecting circuit 240 through the reading signal line Rj. The position detecting circuit 240 may compare the reading signal according to a preset threshold value, so as to determine whether the pixel region 230 accepts the touch event. For example, according to the dark state voltage V1, the reading signal is compared. That is to say, the position detecting circuit 240 may detect a touch point on the optical touch display panel 200 according to the reading signal output by each optical sensing touch unit 232.

After the signal reading element 2323 reads the voltage of the storage capacitor Cs2, the optical sensing element 2321 charges the storage capacitor Cs2 to reset the voltage of the storage capacitor Cs2.

In a specific application example, the optical sensing element 2321 may include at least one TFT. The optical sensing element 2321 includes a control end 2321c, an input end 2321i, and an output end 2321o. The optical sensing element 2321 receives light irradiation of the light source to output the sensing signal corresponding to the output end 2321o, in which the sensing signal may be a photoelectric current. The output end 2321o of the optical sensing element 2321 is connected electrically to the storage capacitor Cs2, so that the generated photoelectric current results in that the voltage of the storage capacitor Cs2 is changed (if the photoelectric current flows from the storage capacitor Cs2 to the output end 2321o, the voltage of the storage capacitor Cs2 is lowered). The signal reading element 2323 reads the voltage of the storage capacitor Cs2, so as to know a degree that the optical sensing element 2321 receives the light irradiation, thereby determining whether the pixel region 230 accepts the touch event.

In another aspect, the optical sensing element 2321 receives a reset signal at the input end 2321i, and outputs a charging signal at the output end 232o according to a control signal received at the control end 2321c. Therefore, the storage capacitor Cs2 is charged by using the charging signal, so as to reset the voltage of the storage capacitor Cs2 changed due to the photoelectric current. Here, the charging signal is a positive current.

Here, the signal reading element 2323 may also be implemented by a TFT. The signal reading element 2323 includes a control end 2323c, an input end 2323i, and an output end 2323o. The input end 2323i is connected electrically to the storage capacitor Cs2, and is configured to read the voltage of the storage capacitor Cs2. The control end 2323c receives another control signal, so as to determine whether to read the voltage of the storage capacitor Cs2 according to the control signal. The output end 2323o of the signal reading element 2323 is connected electrically to the reading signal line Rj, so as to output a reading result (that is, the reading signal), to the position detecting circuit 240.

As shown in FIG. 8, the optical touch display panel 200 further includes bias circuits Bi (that is, B1, B2 . . . Bi, i is a positive integer). The bias circuits Bi are set to be parallel with the scanning signal lines Gn, and the same bias circuit Bi may be connected electrically to the signal reading element 2323 of each pixel region 230 in the second direction. The control end 2323c of the signal reading element 2323c is connected electrically to the bias circuit Bi, so as to receive the control signal. The control signal may be provided by a control circuit (not shown).

Figure 9:
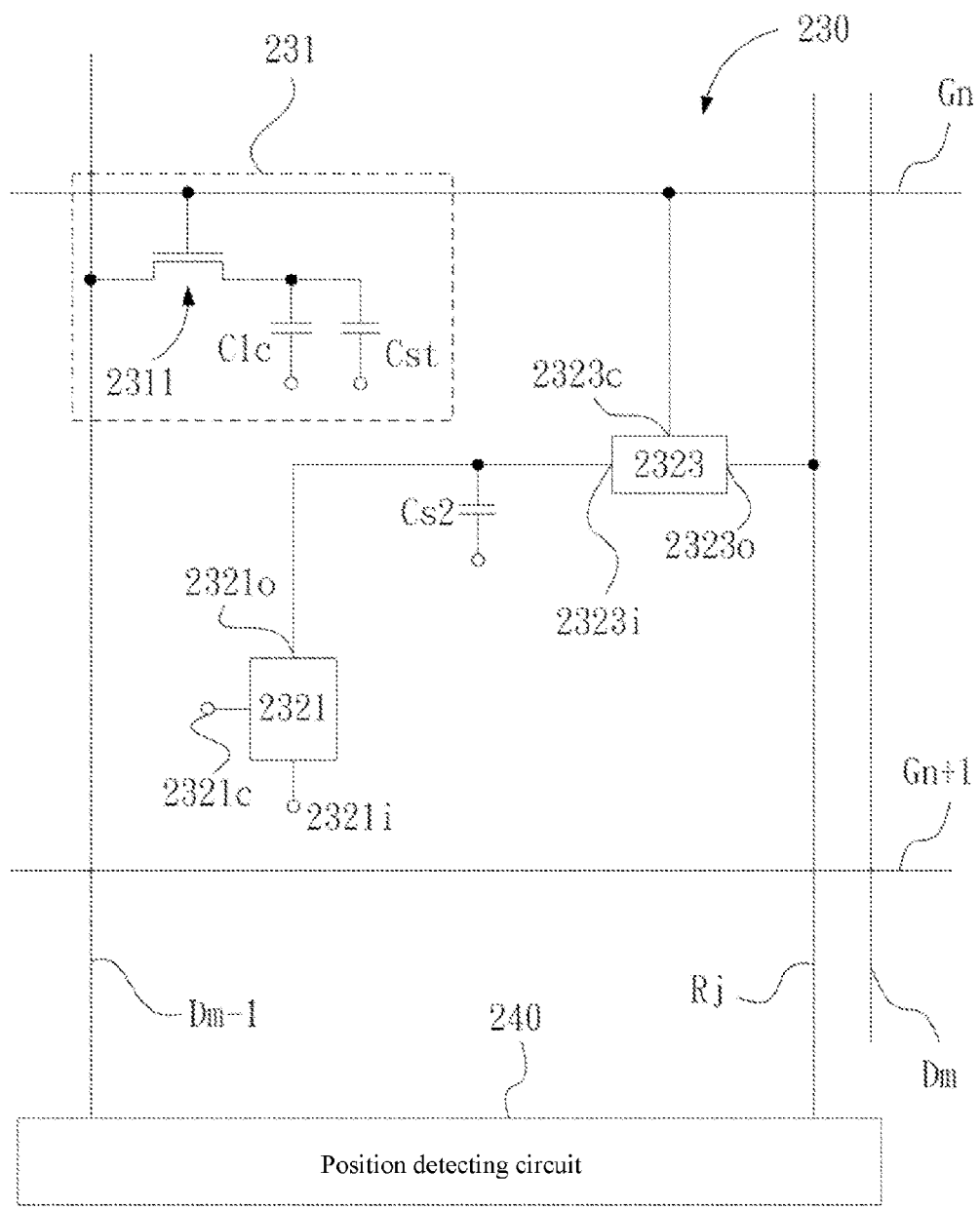
FIG. 9 is a schematic view of a circuit of a pixel region according to another embodiment.

FIG. 9 is a schematic view of another equivalent circuit of the pixel region 230 according to another embodiment.

Please refer to FIG. 9, which is approximately the same as FIG. 8. The control end 2323c of the signal reading element 2323 as shown in FIG. 9 is not connected electrically to the bias circuit Bi as shown in FIG. 8, but is connected electrically to the scanning signal line Gn. That is to say, the scanning signal line Gn may replace the bias circuit Bi, and the scanning signal output by the scanning driving circuit 220 is configured as the control signal for controlling the optical sensing element 2321. Therefore, in addition to controlling the pixel unit 231, the control signal is provided to trigger touch detection action.

Figure 10:
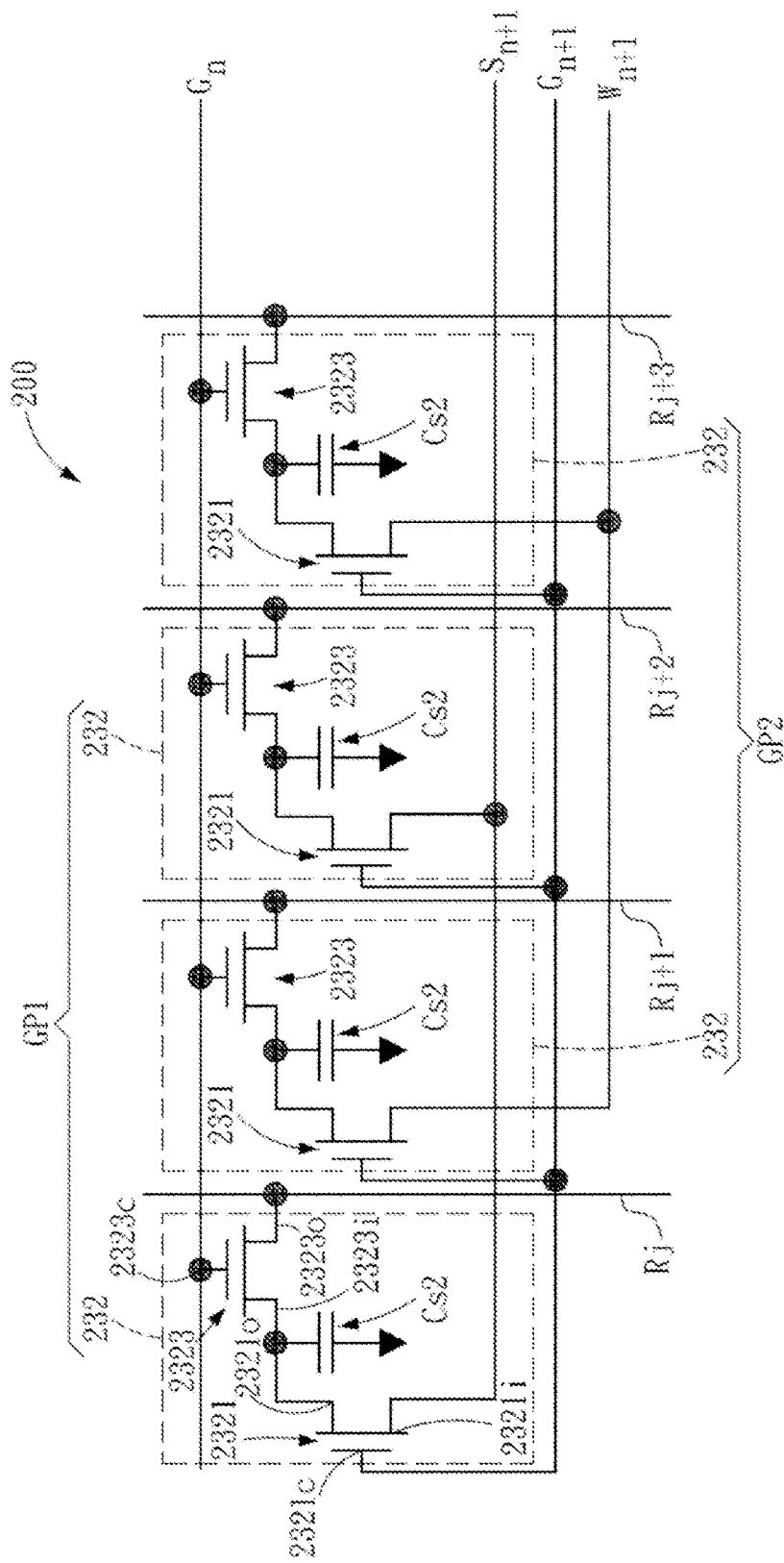
FIG. 10 shows an optical touch display panel according to a first exemplary embodiment.

FIG. 10 shows an optical touch display panel 200 according to a first exemplary embodiment.

As shown in FIG. 10, the optical touch display panel 200 includes a plurality of resetting signal lines Sn (that is, S1, S2 . . . Sn, n is a positive integer), a plurality of scanning signal lines Gn (that is, G1, G2 . . . Gn, n is a positive integer), and a plurality of optical sensing touch units 232. Here, the pixel unit 231, the data driving circuit 210, the scanning driving circuit 220, and the position detecting circuit 240 etc. are not shown in FIG. 10.

Please refer to FIGS. 7, 9, and 10, in which the optical sensing touch units 232 are arranged in a matrix in a first direction and a second direction vertical to the first direction. Each optical sensing touch unit 232 includes an optical sensing element 2321, a signal reading element 2323, and a storage capacitor Cs2. Here, the optical sensing element 2321 and the signal reading element 2323 are respectively, for example, a TFT.

The optical sensing element 2321 is configured to sense a light source to generate a sensing signal, and includes a control end 2321c (that is, a gate of the TFT), an input end 2321i (that is, a source of the TFT), and an output end 2321o (that is, a drain of the TFT). The signal reading element 2323 also includes a control end 2323c (that is, a gate of the TFT), an input end 2323i (that is, a source of the TFT), and an output end 2323o (that is, a drain of the TFT). Functions of the storage capacitor Cs2, the optical sensing element 2321, and the signal reading element 2323 are described, so detailed description is not repeated here.

It should be noted here that the control end 2321c of each optical sensing element 2321 in the first direction is connected electrically to different scanning signal lines Gn (for example, Gn, Gn+1, Gn+2), and is configured to respectively receive the control signal. The control end 2321c of the optical sensing element 2321 in the second direction is connected electrically to the same scanning signal line Gn, and is configured to receive the same control signal. The optical sensing elements 2321 in the second direction are divided into a plurality of groups. The input ends 2321i of the optical sensing elements 2321 of each group are connected electrically to different resetting signal lines (for example, Sn, Wn), so that each group respectively receives the reset signal.

As shown in FIG. 10, the optical sensing elements 2321 in the second direction are divided into two groups GP1, GP2. The input end 2321i of the optical sensing element 2321 of the group GP1 is connected electrically to the resetting signal line Sn+1. The input end 2321i of the optical sensing element 2321 of the group GP2 is connected electrically to the resetting signal line Wn+1. Therefore, as compared with the optical sensing elements which are not divided into group and connected to the different resetting signal lines Sn, the optical sensing element 2321 on the same resetting signal line Sn reduces RC loading, so as to alleviate a delay effect of the capacitor and the resistor, and modify a problem of inconsistency of sensing sensitivity of each touch position on the optical touch display panel 200, thereby improving uniformity of touch sensing on the touch panel.

As shown in FIG. 10, in some embodiments, the optical sensing elements 2321 of each group GP1, GP2 in the second direction region are arranged in a staggered manner.

Figure 11A:
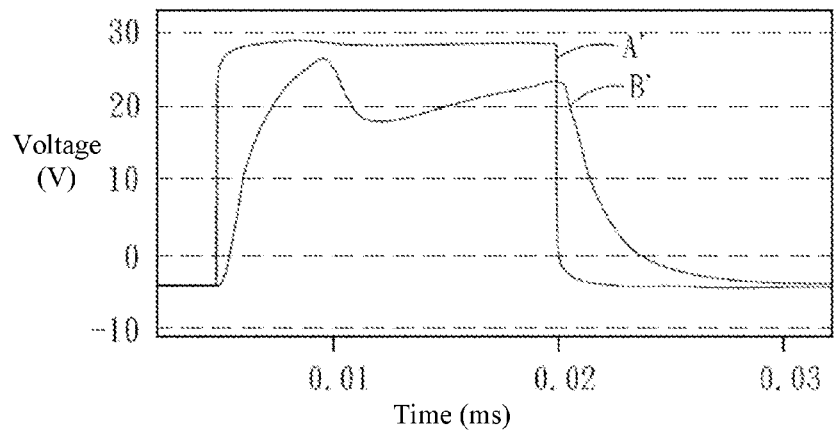
FIG. 11A is a schematic view of reset signals of a head end and a tail end of a resetting signal line according to an embodiment.
Figure 11B:
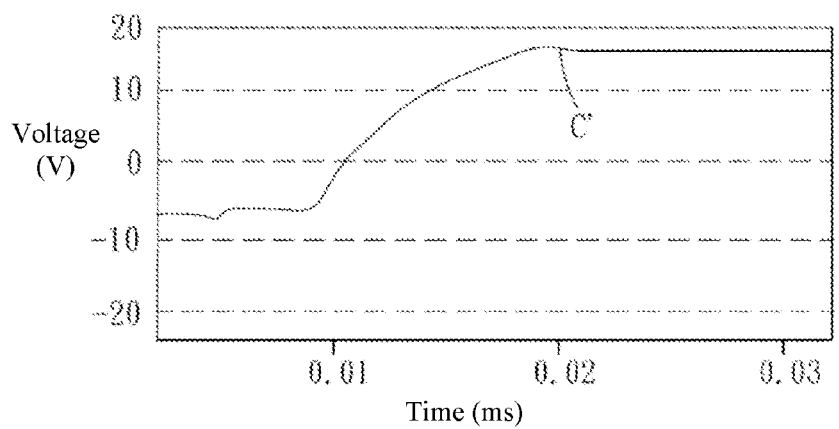
FIG. 11B is a schematic view of charging of a storage capacitor of a head end of a resetting signal line according to an embodiment.
Figure 11C:
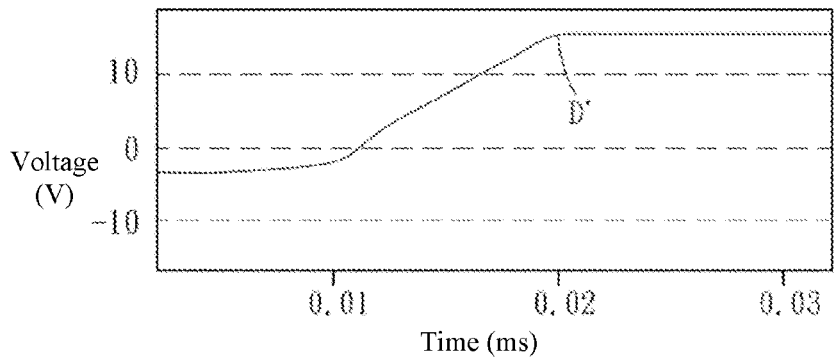
FIG. 11C is a schematic view of charging of a storage capacitor of a tail end of a resetting signal line according to an embodiment.

FIG. 11A is a schematic view of reset signals of a head end and a tail end of the resetting signal line Sn according to an embodiment. FIG. 11B is a schematic view of charging of the storage capacitor Cs2 of the head end of the resetting signal line Sn according to an embodiment. FIG. 11C is a schematic view of charging of the storage capacitor Cs2 of the tail end of the resetting signal line Sn according to an embodiment.

Figure 1:
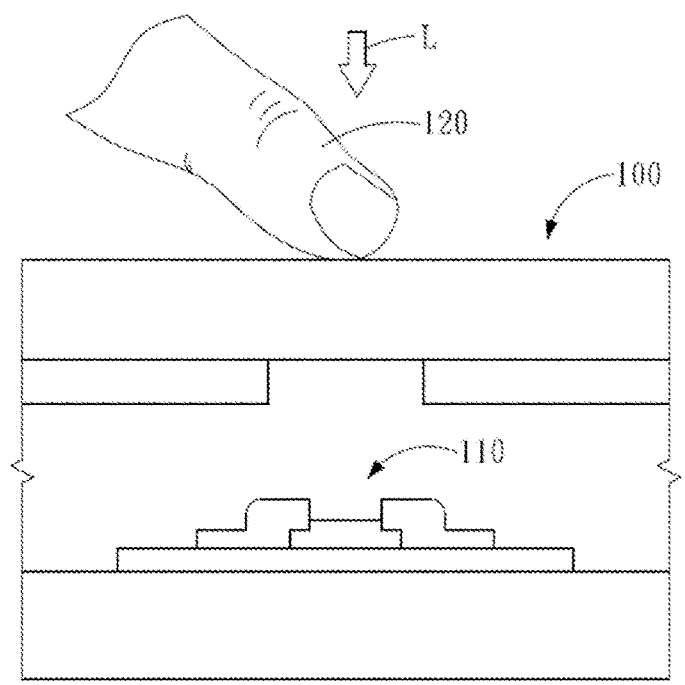
FIG. 1 is a schematic view of detection of an optical sensing touch display panel.
Figure 2:
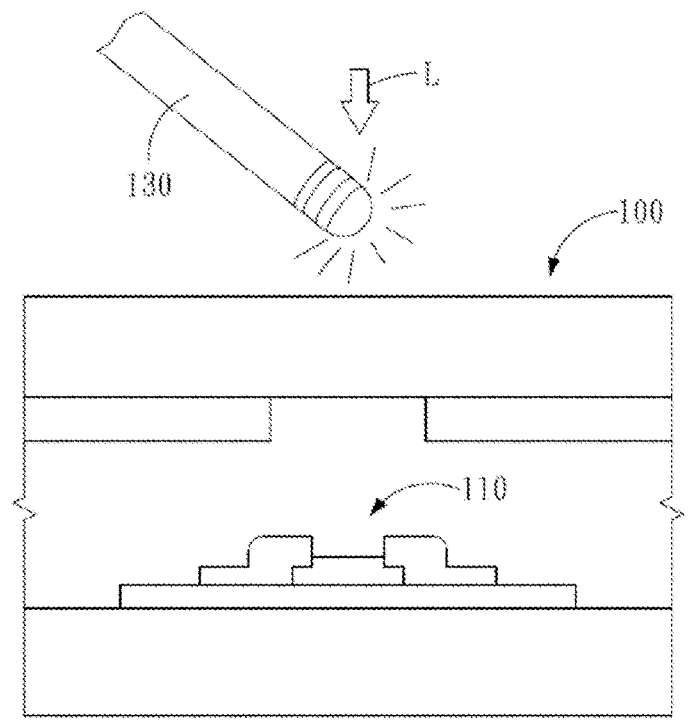
FIG. 2 is a schematic view of another detection of an optical sensing touch display panel.
Figure 3:
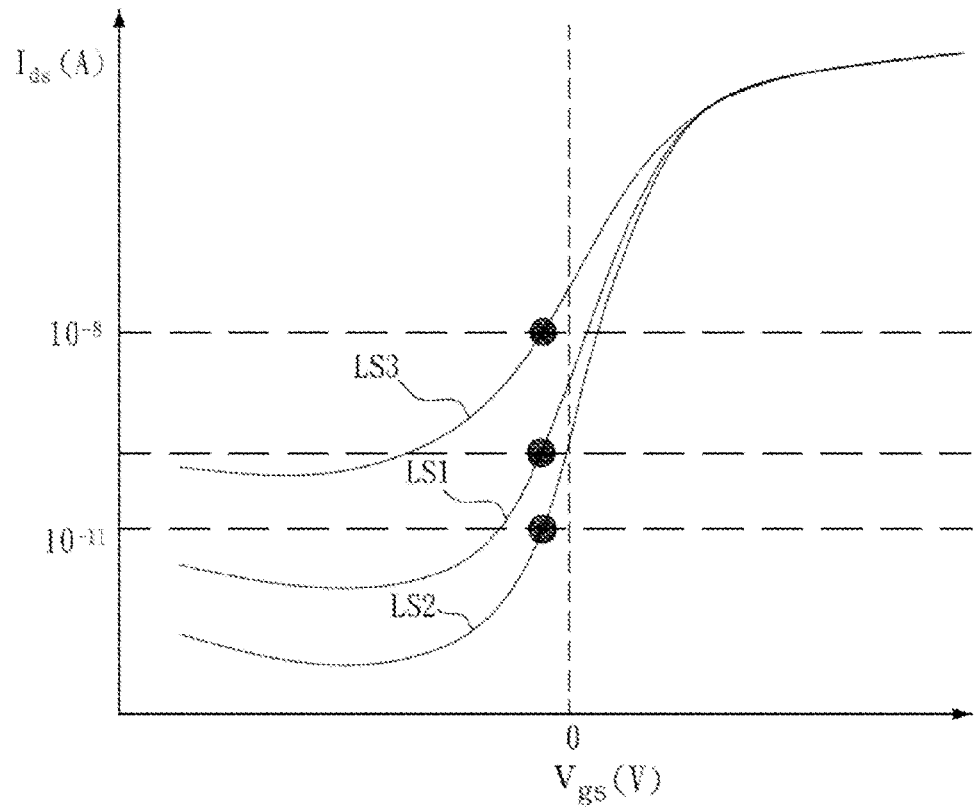
FIG. 3 is a schematic view of optical sensing signals generated by an optical sensing element after receiving different light intensities.
Figure 4:
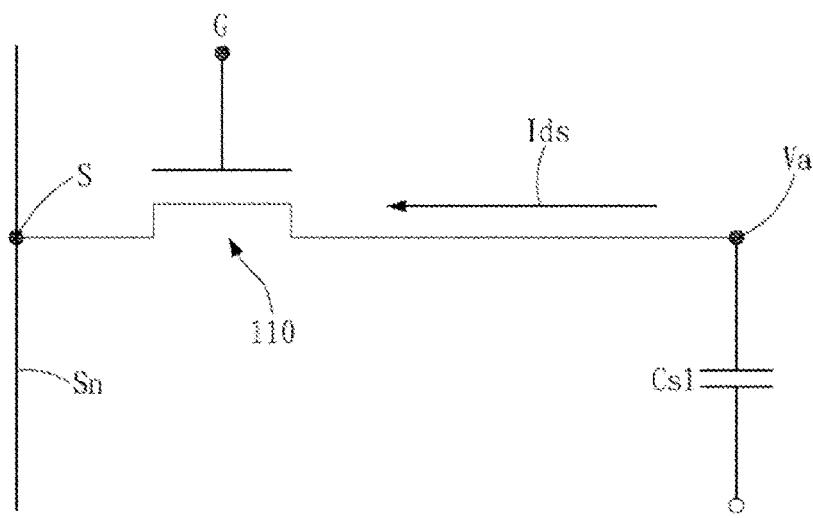
FIG. 4 is a circuit diagram of detection of an optical sensing element.
Figure 5:
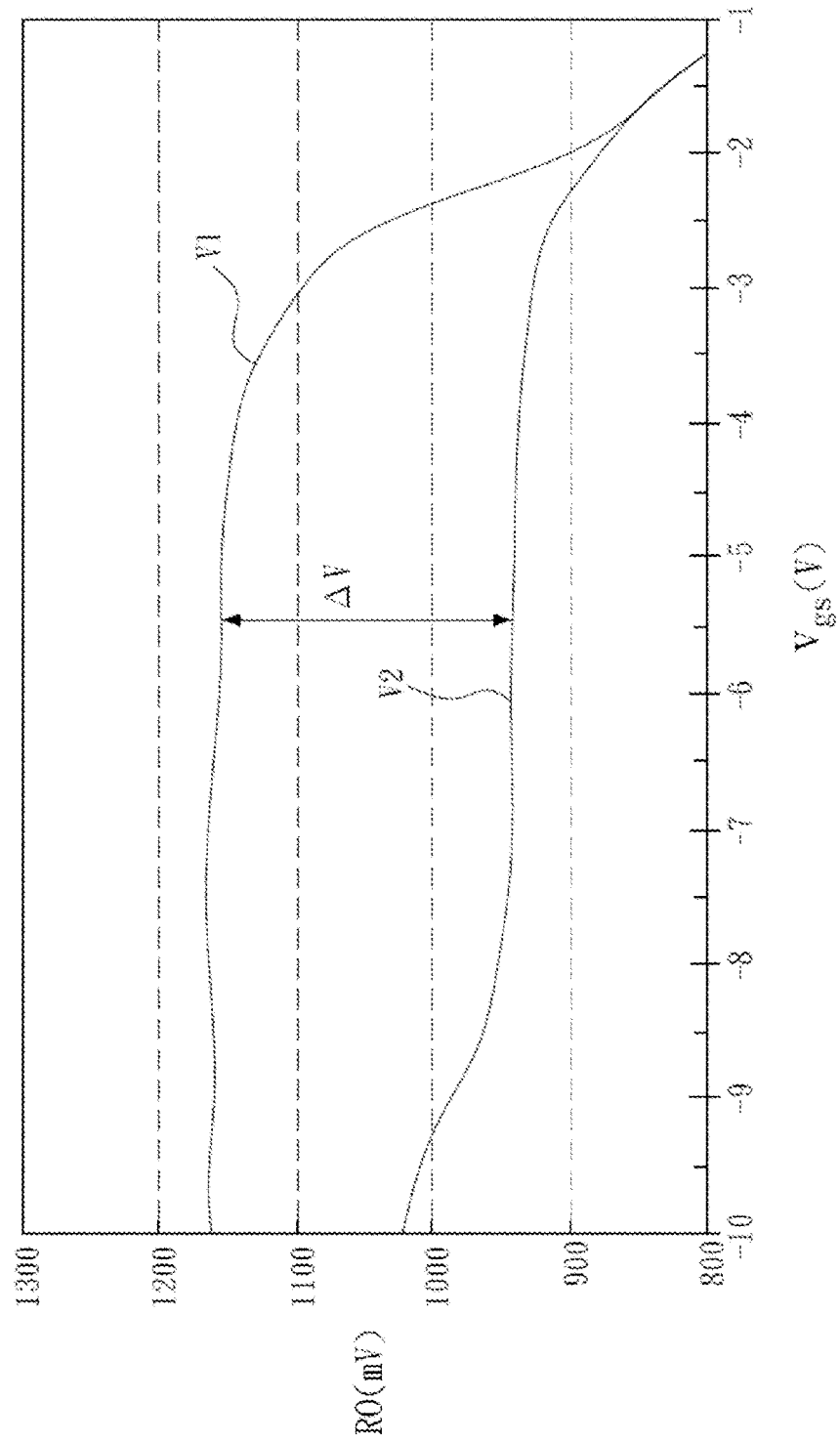
FIG. 5 is a schematic view of a gate source voltage corresponding to a voltage level of a first end of a storage capacitor under irradiation of different light sources.
Figure 6A:
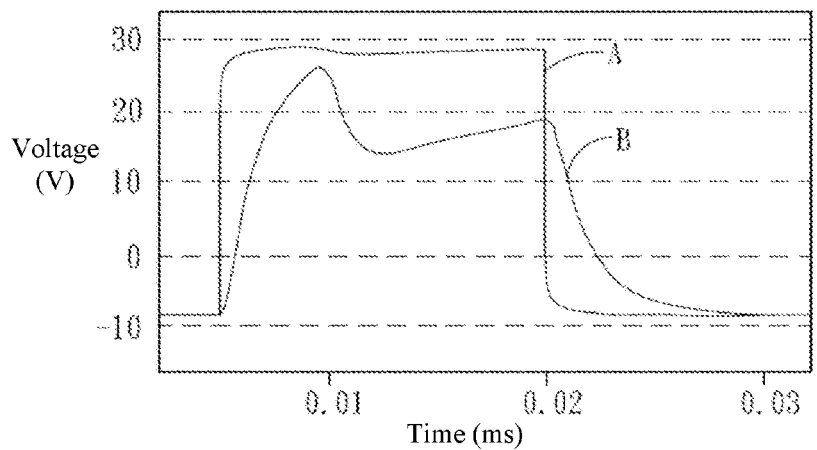
FIG. 6A is a schematic view of reset signals of a head end and a tail end of a resetting signal line.

Please refer to FIGS. 10, 11A, and 11B, in which as shown in FIG. 11A, a curve A' is a waveform of the reset signal measured at the head end (that is, the input end of the reset signal, that is, one end near the resetting driving circuit 250), of the resetting signal line Sn, a curve B' is a waveform of the reset signal measured at the tail end (that is, one end away from the resetting driving circuit 250), of the resetting signal line Sn, as compared with FIG. 6A, at the 0.02 ms, it may be known that by reducing the RC loading, the reset signal (curve B'), of the tail end is improved from approximately 19 volts (curve B), to approximately 23 volts. The voltage of the head end of the resetting signal line Sn is maintained at 29 volts (curve A and curve A').

Figure 6B:
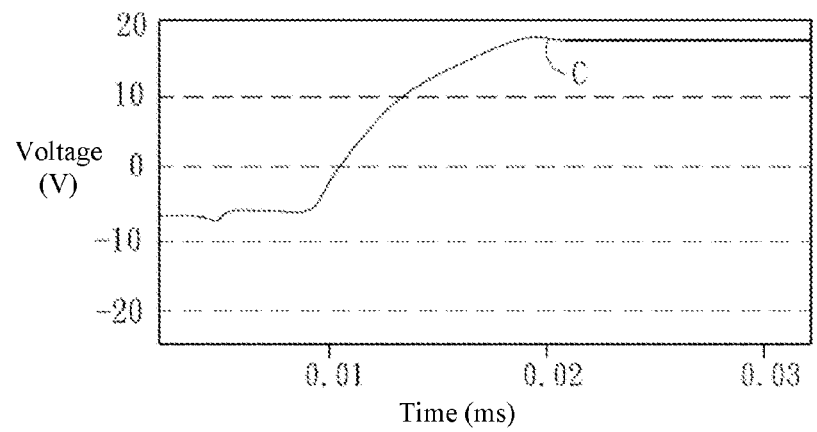
FIG. 6B is a schematic view of charging of a storage capacitor of a head end of a resetting signal line.
Figure 6C:
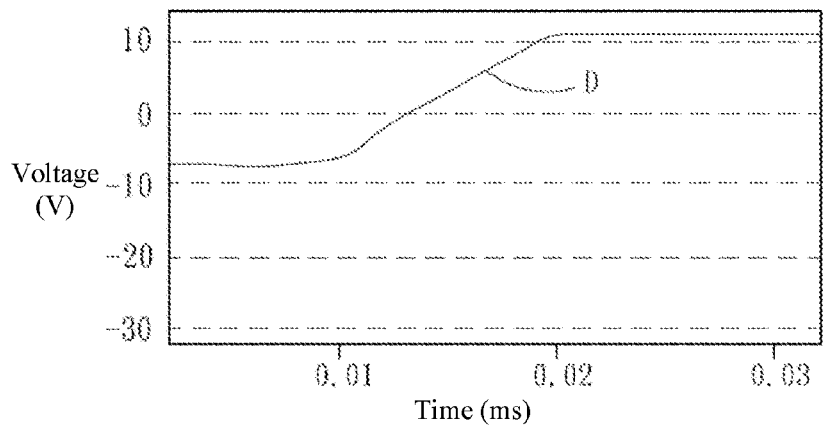
FIG. 6C is a schematic view of charging of a storage capacitor of a tail end of a resetting signal line respectively.

As shown in FIG. 11B, a curve C' is a voltage variation waveform of the storage capacitor Cs2 of the head end of the resetting signal line Sn after being reset; and as shown in FIG. 11C, a curve D' is a voltage variation waveform of the storage capacitor Cs2 of the tail end of the resetting signal line Sn after being reset. It may be known that at 0.02 ms, after the storage capacitor Cs2 of the tail end of the resetting signal line Sn is reset, the voltage is improved from approximately 10 volts (the curve D as shown in FIG. 6C), to approximately 13 volts (the curve D' as shown in FIG. 11C). After the storage capacitor Cs2 of the head end is reset, the voltage is maintained at approximately 18 volts (the curve C as shown in FIG. 6B and the curve C' as shown in FIG. 11B).

In some embodiments, the resetting signal lines Sn, Wn connected to different groups GP1, GP2 may transmit the same reset signal.

In some embodiments, the resetting signal lines Sn, Wn connected to different groups GP1, GP2 transmit different reset signals. That is to say, the reset signals received by the optical sensing elements 2321 in each group (GP1 or GP2), are substantially different from the reset signals received by the optical sensing elements 2321 in another group (GP2 or GP1). For example, voltage amplitudes or duty cycles of the reset signals received by each group GP1 or GP2 are different. Therefore, the storage capacitors Cs2 of the different groups GP1 and GP2 are reset to different voltage levels, so as to respectively provide different operation scopes.

Figure 12:
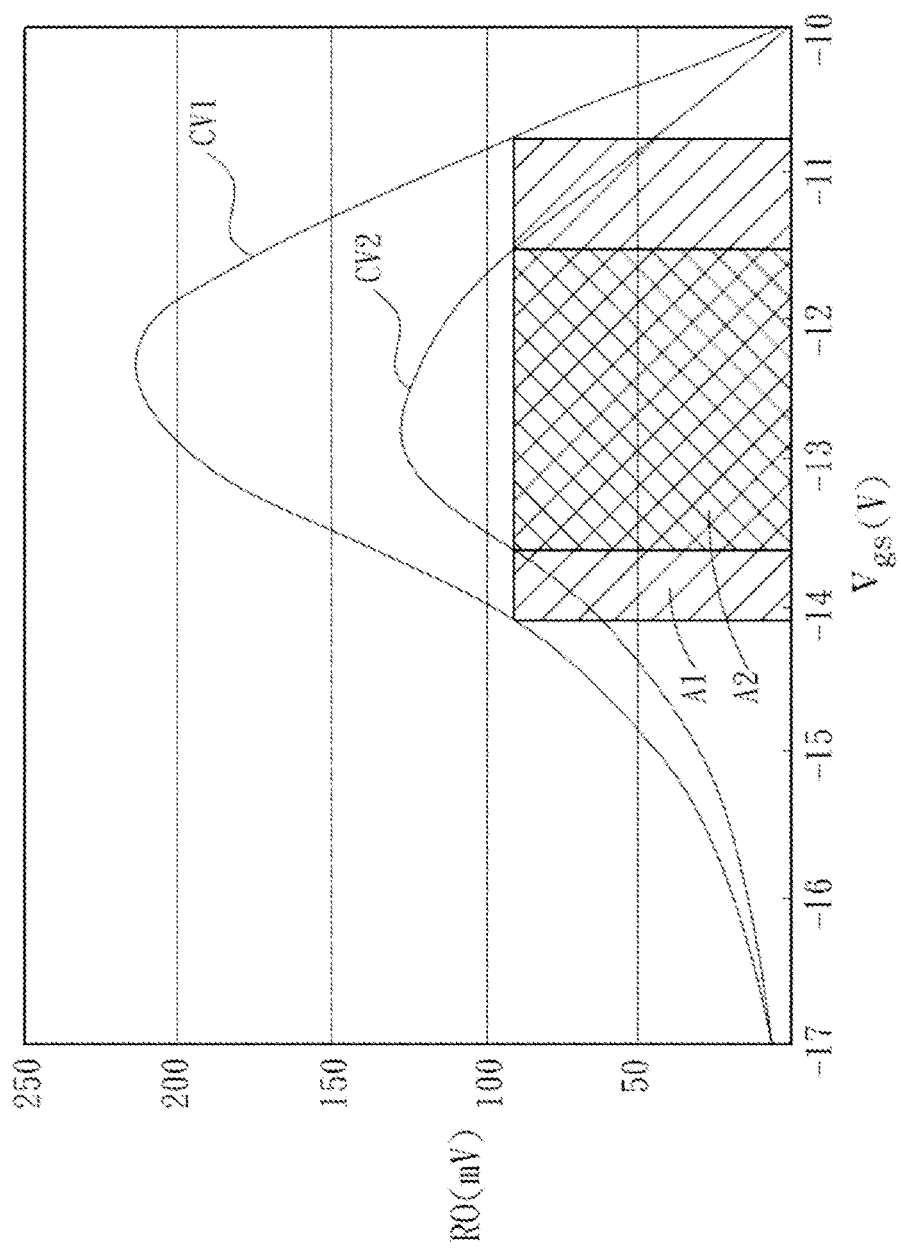
FIG. 12 is a schematic view in which different operation scopes are provided by using different reset signals according to an embodiment.

FIG. 12 is a schematic view in which different operation scopes are provided by using different reset signals according to an embodiment. FIG. 12 shows a curve diagram of a voltage difference RO between the corresponding reading signal of the storage capacitors Cs2 of the groups GP1 and GP2 under the different reset signals Sn and the dark stage voltage V1. A curve CV1 is the voltage difference RO corresponding to the storage capacitor Cs2 of the group GP1 as shown in FIG. 10, and a curve CV2 is the voltage difference RO corresponding to the storage capacitor Cs2 of the group GP2 as shown in FIG. 10.

As shown in FIG. 12, under a specific threshold value, the groups GP1 and GP2 respectively receive reset signals with the different voltage amplitudes, so that the storage capacitors Cs2 of the groups GP1 and GP2 may respectively cover different operation intervals A1 and A2. The operation intervals A1 and A2 overlap each other, so as to improve the touch sensing sensitivity and the applicable scope of the optical touch display panel 200.

Figure 13:
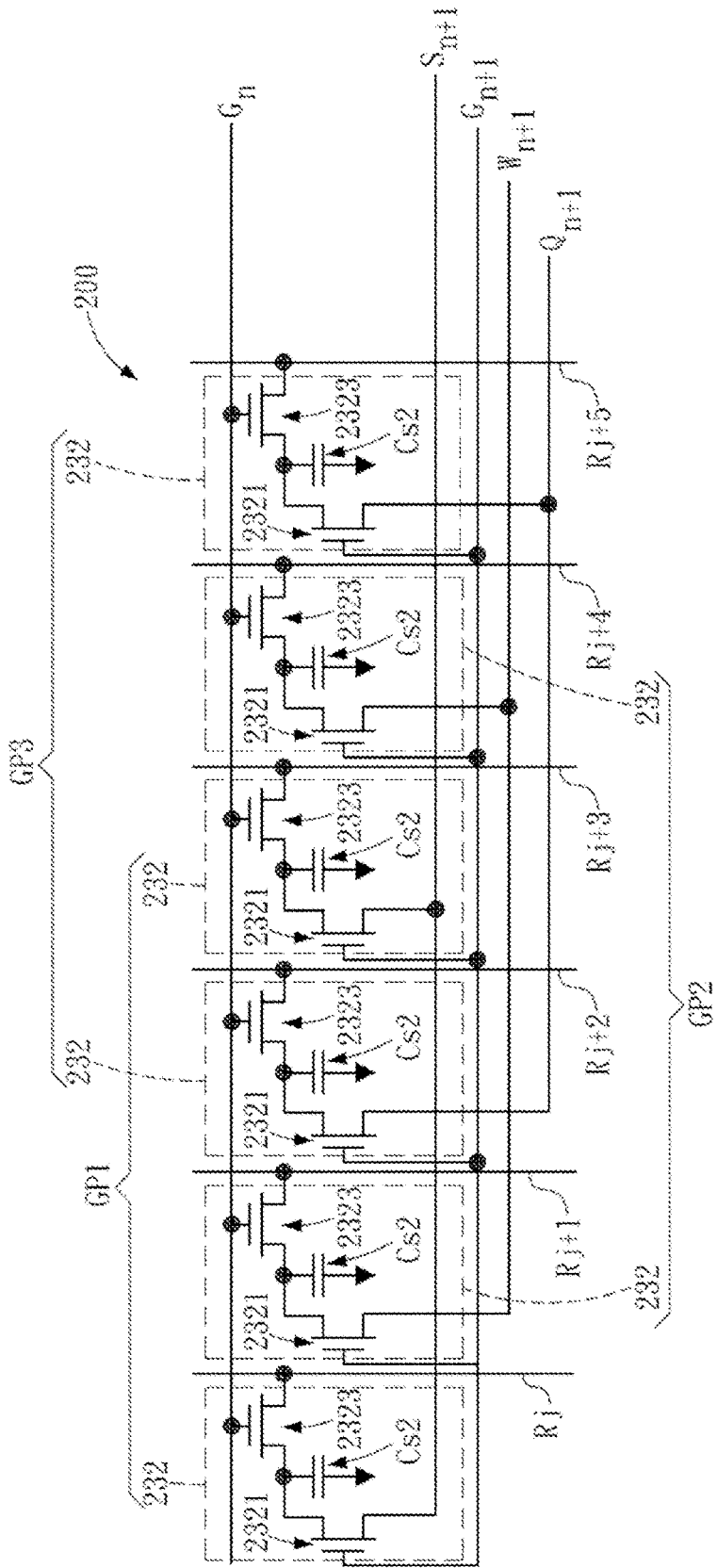
FIG. 13 shows an optical touch display panel according to a second exemplary embodiment.

FIG. 13 shows a second example of the optical touch display panel according to a second exemplary embodiment.

As shown in FIG. 13, the optical sensing element 2321 of the example is divided into three groups GP1, GP2, and GP3 in the second direction. The input end 2321i of the optical sensing element 2321 of the group GP1 is connected electrically to the resetting signal line Sn+1. The input end 2321i of the optical sensing element 2321 of the group GP2 is connected electrically to the resetting signal line Wn+1. The input end 2321i of the optical sensing element 2321 of the group G3 is connected electrically to the resetting signal line Qn+1. By increasing the amount of the groups, as compared with the first exemplary embodiment, the RC loading on the resetting signal line (Sn, Wn, or Qn) is reduced.

Figure 14:
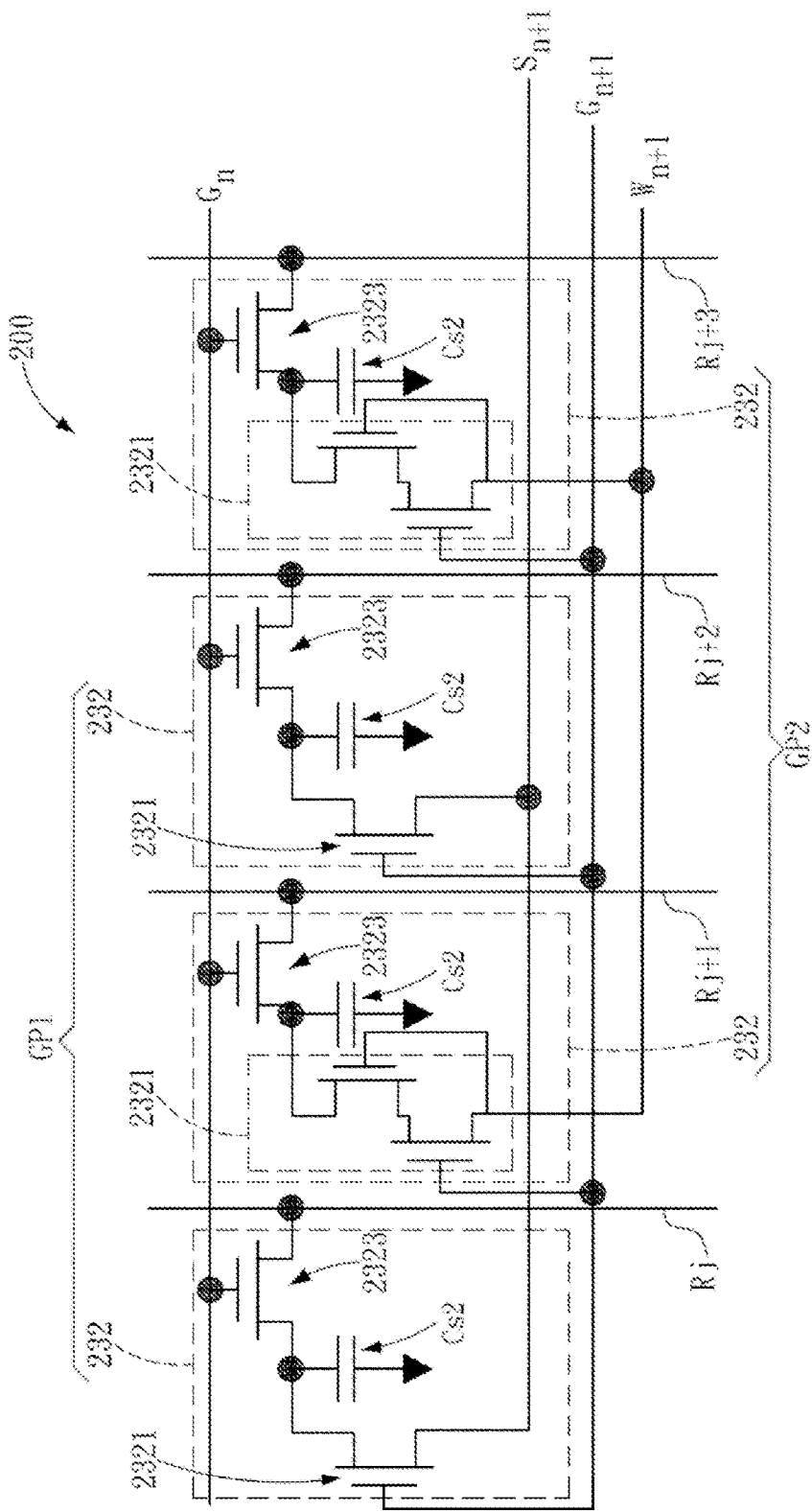
FIG. 14 shows an optical touch display panel according to a third exemplary embodiment.

FIG. 14 is shows an optical touch display panel 200 according to a third exemplary embodiment.

FIG. 14 is approximately the same as FIG. 10, except that the optical sensing elements 2321 of each group are different from the optical sensing elements 2321 of other groups. Here, the reset signal Sn received by each group may be the same. For example, the optical sensing elements 2321 of the group GP1 and the optical sensing elements 2321 of the group GP2 are substantially different transistor elements, for example, transistor characteristics (for example, a channel width length ratio and a carrier mobility etc.), or the amount of the transistors are different. In the example, for example, the optical sensing element 2321 of the group GP1 and the optical sensing elements 2321 of the group GP2 include different amount of transistors, so that the group GP1 and the group GP2 are operated in different gate source voltages Vgs, therefore, the storage capacitor Cs may perform discharging with different discharging efficiencies, thereby generating the different operation intervals A1 and A2.

The optical sensing elements 2321 of the group GP1 and the optical sensing element 2321 of the group GP2 are different transistor elements, so that the generated sensing signals are not the same. That is to say, the sensing signals output by the optical sensing elements 2321 of each group (GP1 or GP2), are substantially different from the sensing signals output by the optical sensing elements 2321 of another group (GP2 or GP1).

Figure 15:
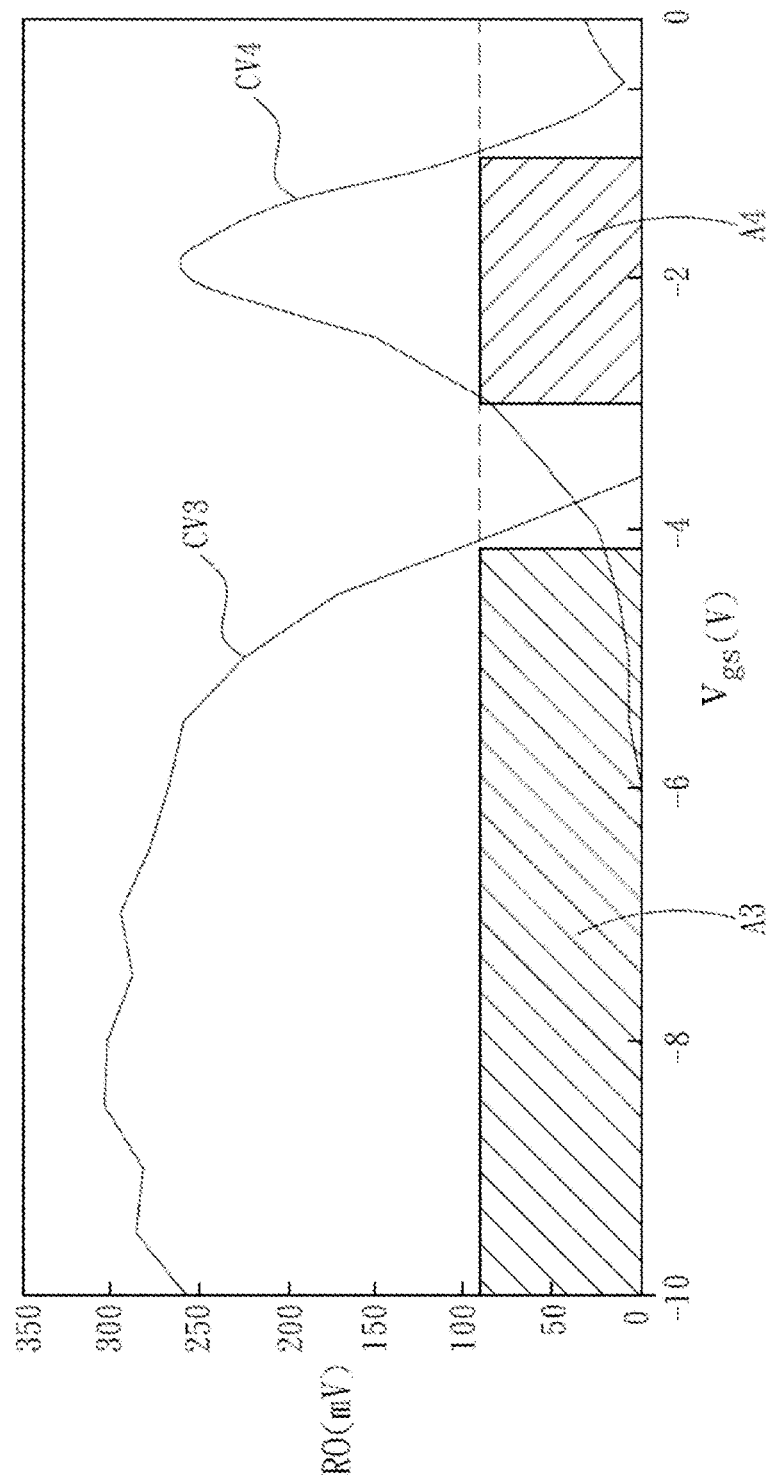
FIG. 15 is a schematic view in which different operation scopes are provided by using different reset signals and control signals according to an embodiment.

FIG. 15 is a schematic view in which different operation scopes are provided by using different reset signals and control signals (that is, different gate source voltages Vgs), according to an embodiment. A curve CV3 is a voltage difference RO corresponding to the storage capacitor Cs2 of the group GP1 as shown in FIG. 14, a curve CV2 is a voltage difference RO corresponding to the storage capacitor Cs2 of the group GP2 as shown in FIG. 14.

In some embodiments, not only the optical sensing elements 2321 of each group GP1 and the optical sensing elements 2321 of GP2 are different, but also the reset signals received by the optical sensing elements 2321 of the group GP1 and the reset signals received by the optical sensing elements 2321 of the group GP2 are different, so that the optical sensing elements 2321 of the two groups GP1 and GP2 may have the operation intervals A3 and A4 being independent from each other under the specific threshold value, as shown in FIG. 15. Therefore, the optical touch display panel 200 may detect two touching manners at the same time. For example, the operation interval A3 may be applicable to a light pen touching mode, and the operation interval A4 may be applicable to a finger touching mode.

Figure 16:
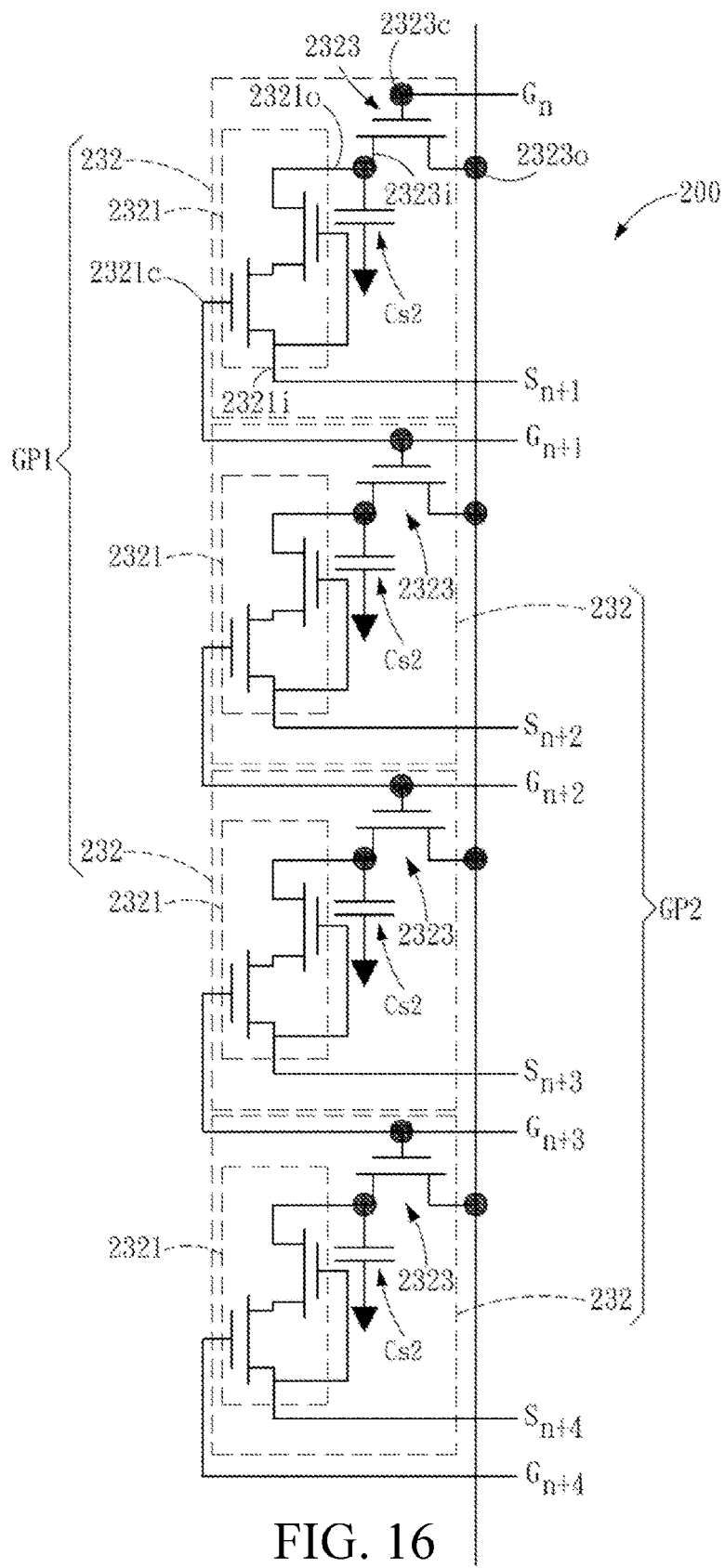
FIG. 16 shows an optical touch display panel according to a fourth exemplary embodiment.

FIG. 16 shows an optical touch display panel 200 according to a fourth exemplary embodiment.

As shown in FIG. 16, the difference with FIG. 10 is that the optical sensing elements 2321 as shown in FIG. 10 are different from the optical sensing elements 2321 as shown in FIG. 16, in addition, the difference is that in the example, the optical sensing elements 2321 in the first direction are divided into different groups (for example, the group GP1 and the group GP2). Further, the optical sensing elements 2321 of the group GP1 and the optical sensing elements 2321 of the group GP2 are arranged in the staggered manner. The control signals received by the control ends 2321c of the optical sensing elements 2321 of the group GP1 may be different from the control signals received by the control ends 2321c of the optical sensing elements 2321 of the group GP2, or the reset signals received by the input ends 2321i of the optical sensing element 2321 of the group GP1 may be different from the reset signals received by the input ends 2321i of the optical sensing element 2321 of the group GP2. Consequently, the touch sensing sensitivity of the optical touch display panel 200 may be improved.

Figures 17A, 17B:
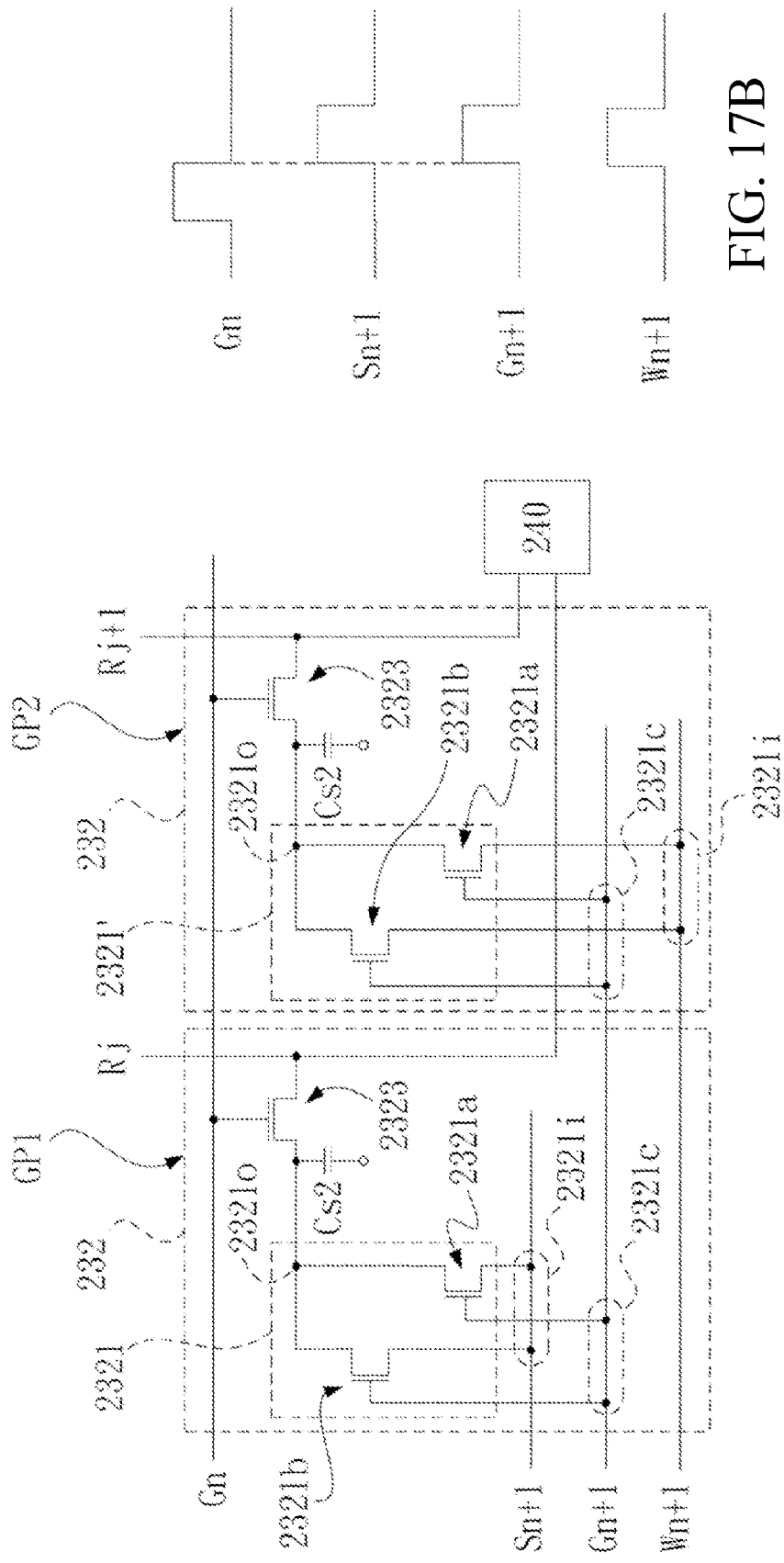
FIG. 17A shows an optical touch display panel according to a fifth exemplary embodiment.
FIG. 17B is a timing chart of scanning signal lines and resetting signal lines as shown in FIG. 17A.
Figure 18:
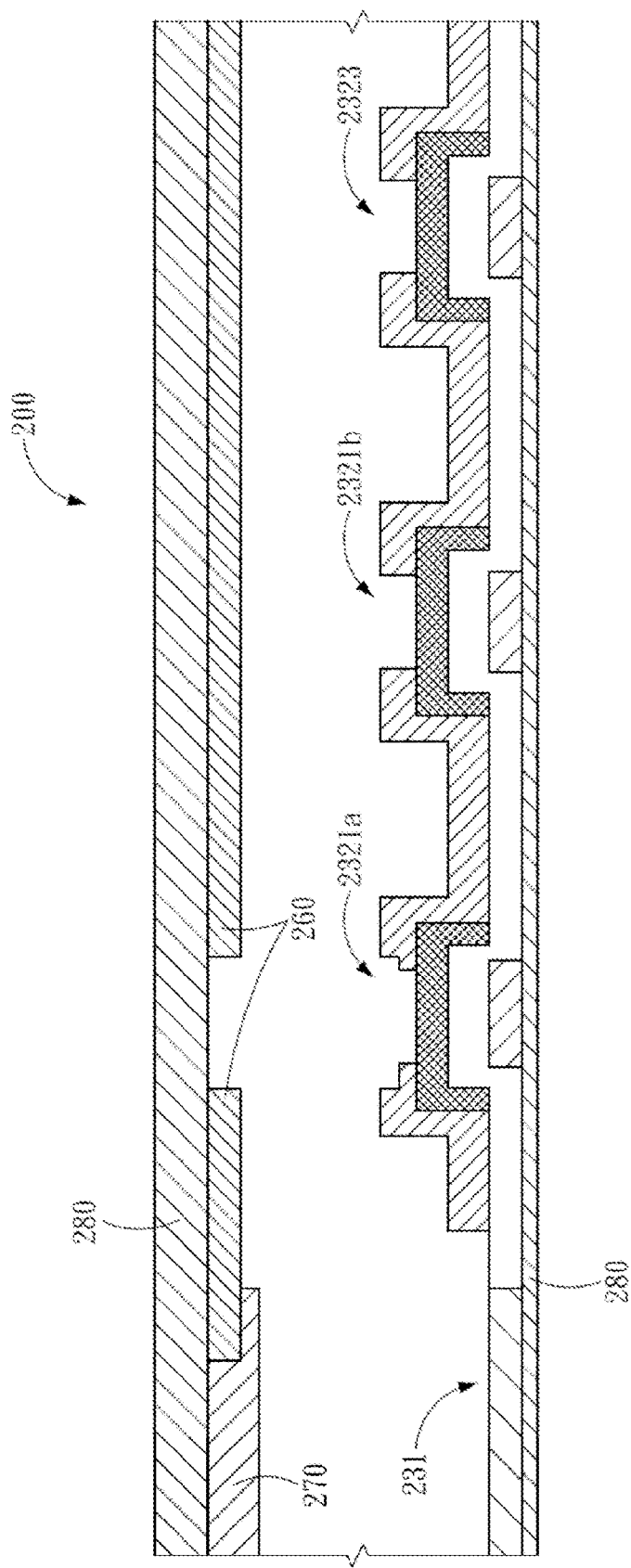
FIG. 18 is a schematic partial cross-sectional view of the fifth exemplary embodiment.

FIG. 17A shows an optical touch display panel 200 according to a fifth exemplary embodiment. FIG. 17B is a timing chart of the scanning signal lines Gn and Gn+1 and the resetting signal lines Sn+1 and Wn+1 as shown in FIG. 17A. FIG. 18 is a schematic partial cross-sectional view of the fifth exemplary embodiment.

The fifth exemplary embodiment is approximately the same as the first exemplary embodiment. FIG. 17A shows that the optical sensing elements 2321 and 2321' in the second direction are divided into two groups (respectively corresponding to the groups GP1 and GP2), as the first exemplary embodiment. The input ends 2321i of the optical sensing elements 2321 of the group GP1 are connected electrically to the resetting signal lines Sn+1. The input ends 2321i of the optical sensing elements 2321' of the group Gp2 are connected electrically to the resetting signal lines Wn+1. As described above, the resetting signal lines Sn+1 and Wn+1 may transmit the same or different reset signals. The difference between the fifth exemplary embodiment and the first exemplary embodiment are described in the following.

Please refer to FIGS. 17A and 18, in which each optical sensing element 2321 and 2321' further includes an optical sensing transistor element 2321a and a charging transistor element 2321b. The optical sensing transistor element 2321a is implemented by at least one TFT. The charging transistor element 2321b may also be implemented by at least one TFT. The charging transistor element 2321b is masked by a masking element 260, so as to prevent from being irradiated by the light source. The optical sensing transistor element 2321a is configured to sense the light source to generate the sensing signal.

As shown in FIG. 18, the optical touch display panel 200 includes a masking element 260, set on the charging transistor element 2321b of the optical sensing element 2321, 2321', and is configured to shield effects of the outside light source. That is to say, the masking element 260 is configured to mask the charging transistor element 2321b, so as to prevent the charging transistor element 2321b from being irradiated by the light source to generate the sensing signal. Similarly, the signal reading element 2323 is also masked by the masking element 260. Therefore, in the optical sensing touch unit 232, only the optical sensing transistor element 2321a may be irradiated by the light source to generate the sensing signal, and in reset time, in addition to the optical sensing transistor element 2321a, the charging transistor element 2321b may charge the storage capacitor Cs2. Here, the masking element 260 may be a black matrix or a color filter.

As shown in FIG. 18, the optical touch display panel 200 further includes a color filter 270, set corresponding to the pixel unit 231. The structure and the operation principle of the liquid crystal display panel, for example, the color filter 270, a substrate 280, an alignment film, liquid crystal, a polarizing plate, and a backlight module etc., are well known by persons skilled in the art, and the detailed description is not repeated here.

In some embodiments, the optical touch display panel 200 of the first exemplary embodiment to the fourth exemplary embodiment may also include a masking element 260, configured to mask the signal reading element 2323, but not mask the optical sensing element 2321.

Please refer to FIG. 17A again, in which the optical sensing transistor element 2321a and the charging transistor element 2321b respectively have the input end (a source here), the output end (a drain here), and a control end (a gate here). The output end of the optical sensing transistor element 2321a is connected electrically to the output end of the charging transistor element 2321b, and is connected electrically to the storage capacitor Cs2.

The optical sensing transistor element 2321a generates a first charging signal according to the control signal transmitted by the scanning signal line Gn+1. The first charging signal is corresponding to the reset signal transmitted by the resetting signal line Sn+1. The charging transistor element 2321b generates a second charging signal according to the control signal transmitted by the scanning signal line Gn+1. The second charging signal is corresponding to the reset signal transmitted by the resetting signal line Wn+1. The optical sensing transistor element 2321a and the charging transistor element 2321b are connected electrically to the output end 2321o, so as to output the first charging signal and the second charging signal to the storage capacitor Cs2.

Please refer to FIGS. 17A and 17B together, in which first the scanning signal line Gn provides a pulse to the control end 2323c of the signal reading element 2323, so that the input end 2323i and the output end 2323o are conducted, thereby transmitting the reading signal to the position detecting circuit 240 through the reading signal line (Rj or Rj+1 etc.), so that the position detecting circuit 240 may determine the touch position.

Next, the scanning signal line Gn+1 further provides a pulse to the control ends 2321c of the optical sensing elements 2321 and 2321', so that the input ends 2321i and the output ends 2321o of the optical sensing elements 2321 and 2321' are conducted, that is, the source and the drain of the optical sensing transistor element 2321a are conducted, and the source and the drain of the charging transistor element 2321b are conducted. At the same time, the resetting signal lines Sn+1 and Wn+1 respectively provide a pulse to the input end of the optical sensing transistor element 2321a and the input end of the charging transistor element 2321b. Therefore, the storage capacitor Cs2 may accept the charging signals provided by the optical sensing transistor element 2321a and the charging transistor element 2321b to perform charge, so as to reset the voltage of the storage capacitor Cs2. During the touch detection event, only the optical sensing transistor element 2321a may receive the outside light source, so that the reset voltage level of the storage capacitor Cs2 may be higher than the reset voltage level of the storage capacitor Cs2 of the first exemplary embodiment.

In some embodiments, the optical sensing transistor element 2321a of the optical sensing element 2321 and the optical sensing transistor element 2321a of the optical sensing element 2321' may be different transistor elements, for example, transistor characteristics (for example, a channel width length ratio and a carrier mobility etc.), or the amount of the transistors are different. Similarly, the charging transistor element 2321b of the optical sensing element 2321 and the charging transistor element 2321b of the optical sensing element 2321' may be different transistor elements, for example, transistor characteristics (for example, a channel width length ratio and a carrier mobility etc.), or the amount of the transistors are different.

Figure 19:
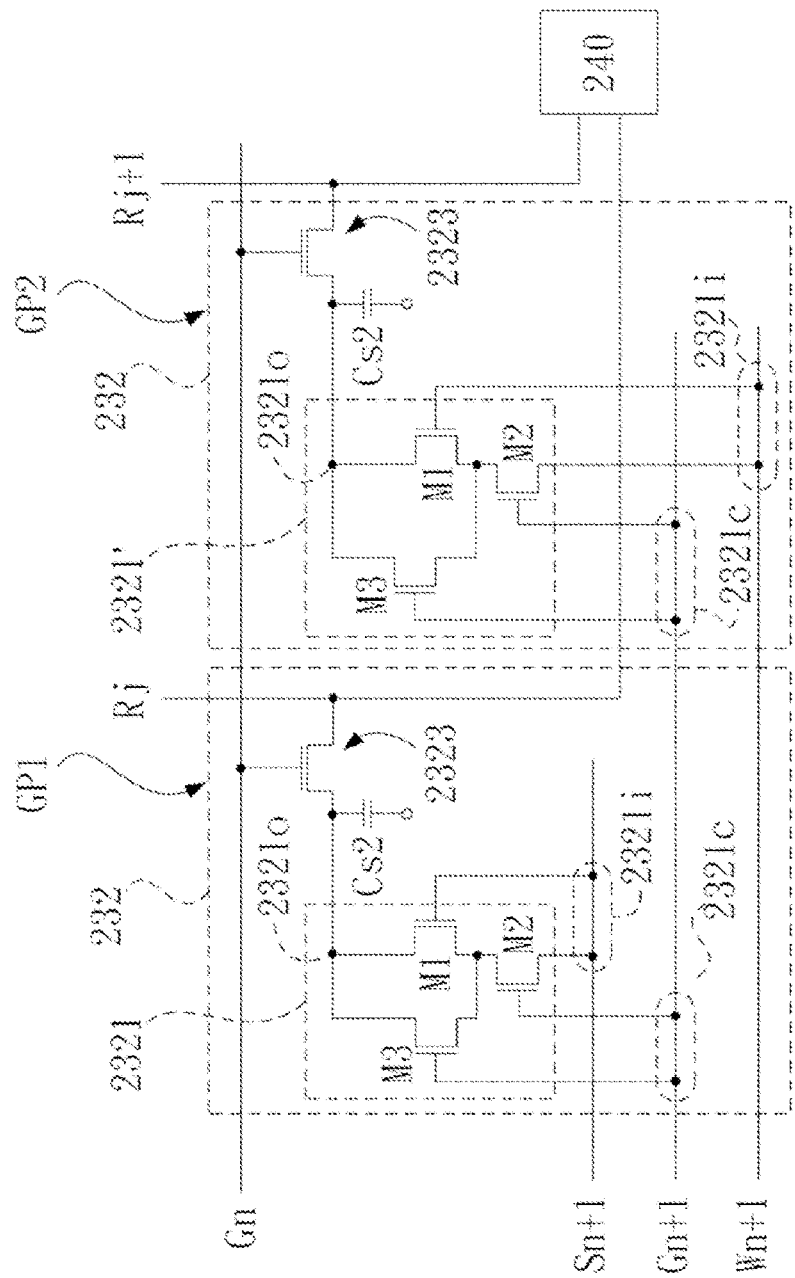
FIG. 19 shows a variation of the fifth exemplary embodiment.

FIG. 19 shows a variation of the fifth exemplary embodiment. As shown in FIG. 19, the optical sensing transistor element 2321a is formed by serially connected TFTs M1 and M2, and the charging transistor element 2321b is implemented by a TFT M3. A drain of the TFT M3 is connected electrically to a drain of the TFT M1, and a source of the TFT M3 is connected electrically to a source of the TFT M1. Therefore, the optical sensing transistor element 2321a and the charging transistor element 2321b may provide the charging signal to the storage capacitor Cs2.

In some embodiments, the drain of the TFT M3 may be changed to be connected to a drain of the TFT M2, and the source of the TFT M3 may be changed to be connected to a source of M2. Therefore, the optical sensing transistor element 2321a and the charging transistor element 2321b may provide the charging signal to the storage capacitor Cs2 at the same time.

In some embodiments, no matter the optical sensing element 2321, 2321' includes the charging transistor element 2321b or not, the optical sensing transistor element 2321a accepts that the masking element 260 masks a part of optical sensing region, so that the optical sensing transistor element 2321a has an optical irradiation area and an optical sensing area smaller than the optical irradiation area. Although the charging signal generated by the optical sensing transistor element 2324 is not changed, by reducing the optical irradiation region, the sensing signal is reduced, so as to achieve the effect that the optical sensing element 2321, 2321' includes the optical sensing transistor element 2321a and the charging transistor element 2321b (the sensing signal is not changed, and the charging signal is increased), (that is, the reset voltage level of the storage capacitor Cs2 is improved).

Here, in the fifth exemplary embodiment and the variation thereof, inner components are further described by using the optical sensing elements 2321 and 2321' in the first exemplary embodiment, but it may be understood by persons of ordinary skill in the art of the disclosure that the optical sensing transistor element 2321a and the charging transistor element 2321b may be applicable to each element above.

To sum up, in the optical touch display panel according to the disclosure, the difference of the signals between the head end and the tail end of the resetting signal line may be effectively lowered, so as to improve uniformity of touch sensing on the touch panel, and improve the voltage level after the storage capacitor Cs2 is reset, thereby increasing the voltage difference ΔV between the dark state voltage and the bright state voltage, and effectively reducing possibility of misjudgment during the touch detection event.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical touch display panel, comprising:
   a plurality of resetting signal lines;
   a plurality of scanning signal lines; and
   a plurality of optical sensing touch units, arranged in a matrix in a first direction and a second direction different from the first direction, and each comprising:
      an optical sensing element, for sensing a light source to generate a sensing signal, and comprising:
         a control end, wherein the control ends of the optical sensing elements in the first direction are connected electrically to different scanning signal lines, and are configured to respectively receive a control signal;
         an input end, wherein the optical sensing elements include a plurality of groups along the first direction or the second direction; and
         an output end, for outputting the sensing signal, and for outputting a charging signal of the reset signal according to the control signal; and
      a storage capacitor, connected electrically to the output end of the optical sensing element, for storing the sensing signal and receiving the charging signal, so as to reset a voltage of the storage capacitor in response to the charging signal;
   wherein, each optical sensing element further comprises a charging transistor element and an optical sensing transistor element, the charging transistor element is masked by a masking element, so as to prevent from being irradiated by the light source, and the optical sensing transistor element is configured to sense the light source to generate sensing signal; and
   wherein, the input ends of the optical sensing elements of each group are connected electrically to a respective resetting signal line, so that each group respectively receives a reset signal.

2. The optical touch display panel according to claim 1, wherein the optical sensing element of each optical sensing touch unit comprises a thin-film transistor, the gate of the thin-film transistor is the control end of the optical sensing element, the source of the thin-film transistor is the input end of the optical sensing element, the drain of the thin-film transistor is the output end of the optical sensing element.

3. The optical touch display panel according to claim 1, wherein the optical sensing element of each optical sensing touch unit comprises a first thin-film transistor and a second thin-film transistor, the source of the first thin-film transistor is connected to the drain of the second thin-film transistor, the gate of the first thin-film transistor is connected to the source of the second thin-film transistor, the source of the second thin-film transistor is the input end of the optical sensing element, the drain of the first thin-film transistor is the output end of the optical sensing element, the gate of the second thin-film transistor is the control end of the optical sensing end.

4. The optical touch display panel according to claim 1, wherein the optical sensing element of each optical sensing touch unit comprises two thin-film transistors, the gates of the two thin-film transistors are connected with each other so as to form the control end of the optical sensing element, the sources of the two thin-film transistors are connected with each other so as to form the input end of the optical sensing element, the drains of the two thin-film transistors are connected with each other so as to form the output end of the optical sensing element.

5. The optical touch display panel according to claim 1, wherein the reset signals received by the optical sensing elements of each group are substantially different from the reset signals received by the optical sensing elements of other groups.

6. The optical touch display panel according to claim 1, wherein the optical sensing elements of each group are different from the optical sensing elements of other groups.

7. The optical touch display panel according to claim 6, wherein each optical sensing element in one of the groups comprises a thin-film transistor, each optical sensing element in another one of the groups comprises two thin-film transistors which are connected in series.

8. The optical touch display panel according to claim 1, wherein the sensing signals output by the optical sensing elements of each group are substantially different from the sensing signals output by the optical sensing elements of other groups.

9. The optical touch display panel according to claim 1, wherein the control ends of the optical sensing elements in the second direction are connected electrically to the same scanning signal line, so as to receive the same control signal.

10. The optical touch display panel according to claim 1, wherein the optical sensing elements of each group in the second direction are arranged in a staggered manner.

11. The optical touch display panel according to claim 1, wherein the optical sensing transistor element generates a first charging signal according to the control signal, the charging transistor element generates a second charging signal according to the control signal, the optical sensing transistor element and the charging transistor element are connected electrically to the output end, so as to output the first charging signal and the second charging signal to the storage capacitor.

12. The optical touch display panel according to claim 1, wherein both the optical sensing transistor element and the charging transistor element comprise a thin-film transistor, the gates of the two thin-film transistors are connected with each other so as to form the control end of the optical sensing element, the sources of the two thin-film transistors are connected with each other so as to form the input end of the optical sensing element, the drains of the two thin-film transistors are connected with each other so as to form the output end of the optical sensing element.

13. The optical touch display panel according to claim 1, wherein the optical sensing element comprises a first thin-film transistor and a second thin-film transistor, and the charging transistor element further comprises a third thin-film transistor, the source of the first thin-film transistor is connected to the drain of the second thin-film transistor and the source of the third thin-film transistor, the gate of the first thin-film transistor is connected to the source of the second thin-film transistor so as to form the input end of the optical sensing element, the drain of the third thin-film transistor is connected to the drain of the first thin-film transistor so as to form the output end of the optical sensing element, the gate of the third thin-film transistor is connected to the gate of the second thin-film transistor so as to form the control end of the optical sensing element.

14. The optical touch display panel according to claim 1, wherein each optical sensing touch unit further comprises: a signal reading element, connected electrically to the storage capacitor, for reading the voltage of the storage capacitor, so as to generate a reading signal;
the optical touch display panel further comprises: a position detecting circuit, connected electrically to the signal reading element of the optical sensing touch unit, so as to detect a touch point on the optical touch display panel according to the reading signal output by each optical sensing touch unit.

15. The optical touch display according to claim 14, wherein the signal reading element comprises a thin-film transistor, the source of the thin-film transistor is connected to the storage capacitor, the drain of the thin-film transistor is connected to a reading signal line, the gate of the thin-film transistor is connected to a bias circuit or a scanning signal line.

* * * * *